United States Patent Office 2,716,646
Patented Aug. 30, 1955

2,716,646

PROCESS FOR PREPARING AROMATIC NITRILES

Albert V. Willett, Jr., Wilmington, and John R. Pailthorp, New Castle, Del., assignors to E. I. du Pont de Nemours & Company, Wilmington, Del., a corporation of Delaware No Drawing. Application August 29, 1951, Serial No. 244,252

7 Claims. (Cl. 260—294.9)

This invention relates to an improved process for the manufacture of aromatic nitriles, and more particularly to a process for producing aromatic nitriles by reacting nuclear halogenated aromatic compounds with hydrogen cyanide.

While the prior art discloses a number of methods for preparing aromatic nitriles, they have not proved practical from a commercial standpoint because they involve the use of expensive organic compounds as starting materials or the yield of the resulting nitrile is too low to be practical. While fairly good yields of aromatic nitriles have been obtained by processes involving reaction in liquid phases, these reactions are not readily converted to continuous processes and usually present operating difficulties which are not readily overcome in adapting the processes to large scale commercial production.

It is therefore an object of the present invention to provide a process for preparing aromatic nitriles from nuclear halogenated aromatic compounds by reacting them with hydrogen cyanide in vapor phase in the presence of a catalyst of the class consisting of nickel oxide, aluminum oxide, silicon dioxide and mixtures of the same.

We have found that aromatic nitriles may be prepared in relatively good yields by reacting a nuclear halogenated aromatic compound containing from 1 to 3 halogen atoms of the class consisting of Cl, Br and I, with at least 1 mol of hydrogen cyanide (HCN), the reaction being carried out in the vapor phase at temperatures of from 450° to 900° C. in the presence of a catalyst of the group consisting of nickel oxide, aluminum oxile ($Al_2O_3$) and silicon dioxide ($SiO_2$) or mixtures of the same, the mixed vapors being passed over or through the catalyst at a space velocity of 150 to 1200 per hour. "Space velocity" (S. V./hr.) is the volume of reactants per unit volume of catalyst at standard temperature and pressure (one atmosphere pressure at 0° C.).

The nuclear halogenated aromatic compounds which may be converted to the aromatic nitriles by the process described above are particularly those of the benzene, naphthalene, thiophene, pyridine and quinoline series containing from 1 to 3 halogen atoms, which, however, do not carry active substituents other than the halogen. By this reaction from 1 to 3 of the halogen atoms can be replaced by the nitrile group. It will of course be obvious that since the reaction is carried out in the vapor phase it is particularly applicable to the conversion of those nuclear halogenated aromatic compounds which can be vaporized without decomposition at the temperatures required for effecting the nitrilation.

The HCN employed may be of the quality generally available on the market. HCN may be used as such or, if desired, it may be formed in the reaction in the presence of the aromatic halide; for example, by using carbon monoxide and ammonia or by the decomposition of formamide, as will be illustrated in the following examples. The formamide may be introduced either as a liquid or vapor. The HCN may also be generated from either of the sources mentioned prior to contact with the aromatic halide, by processes well known to those familiar with the art and which are described in literature. When the formamide is introduced directly into the reaction zone in the vapor phase, the addition of an inert gas such as nitrogen ($N_2$) is desirable. It will be obvious that when an inert gas is employed or when water is formed during the formation of the HCN in the reaction, the space velocities will be adjusted accordingly.

While the ratio of HCN to the halogenated aromatic compound may be varied to a considerable degree, the use of from 1.5:2.0 mols of HCN per halogen to be replaced is preferred. While less than one mol of HCN per halogen to be removed may be employed, lower conversions to the desired product are obtained usually requiring extra effort in working up the resulting products. Higher amounts of HCN, up to at least 4 mols per halogen to be replaced, have been found to be operative. By controlling the ratio of HCN to halogenated aromatic compound in the nitrilation of the polyhalogen aromatic compounds, the ratio of mono- and polynitrile compounds produced can be varied. The ratio of the mono- and polynitrile compounds produced from the polyhalogenated aromatic compounds can also be controlled by the catalyst employed and other reaction conditions, as will be described hereinafter.

The nuclear halogenated aromatic compounds, particularly the benzene, naphthalene, thiophene and pyridine and quinoline, may contain from 1 to 3 halogen of the group consisting of chlorine, bromine and iodine, provided those compounds can be vaporized without decomposition under the conditions of the reaction. Although the halogen present in the molecule may be different, the commonly available di- and polyhalogenated aromatic compounds will in general contain the same halogen.

The catalysts employed may be used alone or they may be supported on the conventional catalyst support. The preferred catalysts are nickel oxide supported on alumina, or alumina alone. Other supports may of course be used, such as silica, clay or carbon in the various commercially available forms. The physical form of the catalyst is not critical but for satisfactory results, particularly in packed beds, it is preferred to use supports containing particles of from approximately 8 to 14 mesh, for very fine particles of the catalyst obstruct the passage of the gas through the reaction tube, whereas larger particles do not present sufficient surface. The catalysts employed in this invention are available in various commercial forms.

As illustrated in the following examples, the more active catalysts tend to replace more of the halogen in the aromatic compound. In a similar manner, more vigorous conditions such as temperature and time employed will usually give a greater proportion of the polynitrile compounds, where polyhalogenated aromatic compounds are used as the starting material.

The amount of catalyst used will obviously be a function of the space velocity. The concentration of the actual catalyst in a supported catalyst is not critical, although this concentration has a measurable effect in most cases on the efficiency of the catalyst. For example, where nickel oxide is employed on a support, an increase in the concentration of the nickel from 7% to 25% materially increases the activity of the catalyst, although on the other hand this advantage is offset by requiring a longer regeneration time. As indicated above, supported nickel oxide is the preferred catalyst and it is preferably employed with a nickel content of about 10%.

It will be obvious that the temperature and space velocity are closely related. In general a temperature in the upper end of the defined range permits the use of higher space velocity, thus giving a higher through-put of reactants with higher hourly production. A preferred combination of temperature and space velocity is from 500° to 700° C. at a space velocity of from 500 to 600 volumes per hour. The preferred conditions will vary, depending upon the reactivity of the starting material.

The space velocity will also vary with the starting material and the source of the hydrogen cyanide employed, for when an inert gas such as nitrogen is used as a carrier for the starting material or as a source of HCN, the space velocities will of course be altered without materially changing the mol ratio of the reactants.

Temperatures below 450° C. require an uneconomically long reaction time, while at temperatures above 900° C. many of the compounds decompose. Very low space velocities also tend to lead to decomposition of the organic material, while at very high space velocities such as above 1200, the reaction will be less complete, thus requiring excessive purification and recycling of the unreacted starting material.

The invention is not limited to any particular source of hydrogen cyanide. The above mentioned processes are given merely as illustrations. As a further source, HCN may be formed by the reaction of ammonia with hydrocarbons either in the reaction tube or prior to the introduction of the HCN into the reactors.

This vapor phase catalytic reaction may be carried out in fluid bed reactors as well as with the static catalyst bed. The advantages of the fluid bed method, such as close temperature control, ease in recycling the catalyst and the possible continuous catalyst regeneration, etc., are well known.

The reaction gases, including the unreacted materials which are employed in excess, may be recovered or recycled by any of the methods usually employed in continuous vapor phase catalytic reactions; for example, the HCN may be recovered as sodium cyanide or may be recycled as gaseous HCN.

This process provides a new and valuable method for the continuous production of aromatic nitriles giving relatively high yields, with the labor cost reduced to a minimum. Organic nitriles are of particular value as intermediates in the formation of amines, acids, amides, esters, isocyanates, etc.

The following examples are given to illustrate the invention. The parts used are by weight unless otherwise specified, and the mol ratios (M. R.) are expressed in mols of HCN per mol of organic halogen compound used.

EXAMPLE 1

Thirty-three (33) grams of p-chlorotoluene and 20.2 grams of HCN gas (M. R. 3) were passed simultaneously over a period of 1 hour at a space velocity of about 247/hr. through a steam-jacketed condenser into a quartz tube reactor heated externally to 500° C. and containing 84 grams of catalyst consisting of about 4.5% Ni as Ni and nickel oxide on 8 to 14 mesh $Al_2O_3$. The reactor consisted of a 20 mm. I. D. quartz tube packed with catalyst for 11 inches. The excess HCN was neutralized in a sodium hydroxide scrubber. The product, condensed in an ice-cooled receiver, was washed free of cyanide with dilute sodium hydroxide solution, dried and analyzed by the infra-red method in which the product is examined under infra-red light and the resulting absorption curve is compared with known standards. The product consisted of 25 grams of liquid analyzing 85% of p-tolunitrile and 15% p-chlorotoluene. This corresponds to a 72.6% conversion and 78.6% yield.

EXAMPLE 2

Over a period of 2 hours, 148 grams of molten p-dichlorobenzene was run into an Inconel reactor held at 550° to 580° C. together with 108 grams of HCN (M. R. 1) at a space velocity of about 600. The reactor contained 116 grams of catalyst consisting of 14% Ni as NiO on $Al_2O_3$. There was obtained as a product 110 grams of solid which consisted of 98.3% terephthalonitrile, 1.0% p-chlorobenzonitrile and 1.0% of p-dichlorobenzene. This corresponds to an 84.4% conversion to terephthalonitrile.

EXAMPLE 3

Using the equipment and general procedure of Example 1 with the catalyst as described in that example or as listed in the following table, various halogenated aromatic compounds were passed through the reactor with HCN in the mol ratio as given. The conditions employed and results obtained are given in Table 1.

*Table 1*

| Compound | M. R. | S. V./hr. | Temp. (° C.) | Percent Conversion | Percent Yield | Nitrile Formed | Catalyst |
|---|---|---|---|---|---|---|---|
| chlorobenzene | 1.1 | 632 | 900 | 13.6 | 18.3 | benzonitrile | As used in Ex. 1. |
| p-dichlorobenzene | 3.2 | 490 | 500 | 93.0 | 94.3 | terephthalonitrile | Do. |
| o-dichlorobenzene | 3.0 | 247 | 600 | 78.0 | 78.0 | phthalonitrile | Do. |
| chloroxylene | 2.0 | 185 | 520 | 52.8 | 71.0 | xylyl nitrile | Do. |
| p-iodotoluene | 2.7 | 253 | 500 | 80.0 | 100.0 | p-tolunitrile | Do. |
| 1,2,4-trichlorobenzene | 4.0 | 463 | 600 |  |  | phthalonitrile / terephthalonitrile / 1,2,4-tricyanobenzene | Do. |
| alpha-chloronaphthalene | 2.0 | 185 | 550 | 30.1 | 57.0 | alpha-cyanonaphthalene | Do. |
| p-chloro-o-toluidine | 4.0 | 308 | 700 | 6.8 | 23.2 | 3-amino-p-tolunitrile | Do. |
| o-nitrochlorobenzene | 1.3 | 558 | 450 | 7.5 | 49.3 | o-nitrobenzonitrile | Do. |
| p-chlorophenol | 2.0 | 370 | 600 | 14.5 | 38.5 | p-chlorobenzonitrile | Do. |
| p-chloroanisole | 2.1 | 254 | 550 | 9.2 | 21.0 | do | Do. |
| 2-chlorothiophene | 1.5 | 308 | 550 | 51.0 | 55.0 | 2-cyanothiophene | Do. |
| alpha-bromopyridine | 2.0 | 240 | 700 | 4.2 | 22.0 | alpha-cyanopyridine | Do. |
| alpha-chloroquinoline | 2.0 | 185 | 550 | 26.0 | 34.1 | alpha-cyanoquinoline | Do. |
| p-chlorotoluene | 3.0 | 247 | 500 | 72.6 | 78.6 | p-tolunitrile | Do. |
| alpha-chloropyridine | 2.3 | 265 | 700 | 30.3 | 65.0 | alpha-cyanopyridine | Do. |
| m-dichlorobenzene | 4.4 | 303 | 600 | 12.3 | 41.7 | isophthalonitrile | Do. |
| chlorobenzene | 1.0 | 675 | 700 | 19.6 | 23.3 | benzonitrile | nickel oxide on clay. |
| alpha-chloronaphthalene | 2.0 | 185 | 550 | 3.4 | 44.5 | alpha-cyanonaphthalene | $SiO_2$. |
| chlorobenzene | 1.4 | 596 | 800 | 29.0 | 55.7 | benzonitrile | Ni on $SiO_2$. |
| p-chlorotoluene | 1.5 | 310 | 455 | 5.5 | 13.2 | p-tolunitrile | Ni on $Al_2O_3$. |
| p-dichlorobenzene | 3.0 | 490 | 500 | 89.0 | 97.0 | terephthalonitrile | nickel oxide on $Al_2O_3$. |
| Do | 3.2 | 490 | 550 | 83.0 | 91.0 | do | $Al_2O_3$. |

EXAMPLE 4

Forty-seven (47) grams of chlorobenzene, 8.6 grams of $NH_3$ and 14.1 grams of CO (M. R. as HCN of 1.2) were fed simultaneously through a steam heated tube into a quartz reactor as described in Example 1 (outside temperature 500° to 520° C.), containing 93.3 grams of Ni on "filtercel" catalyst over a period of 24 minutes at a space velocity of about 715/hr. The product condensed in a receiver surrounded by an ice bath, was washed free of cyanide with dilute sodium hydroxide solution, dried, and analyzed by intra-red analysis. It consisted of 26 grams of liquid analyzing 10.2% benzonitrile and 72.8% benzene corresponding to a conversion to the nitrile of 6.26%.

EXAMPLE 5

59.5 grams of chlorobenzene, 28.4 grams of formamide vapor (M. R. as HCN of 1.2) and 15.9 grams of $N_2$ were fed simultaneously into a quartz reactor as described in Example 1 (external temperature 500° to 520° C.), containing 85 grams of Ni on $Al_2O_3$ catalyst over a period of about 27 minutes at a space velocity of 722. The product, condensed in a receiver, surrounded by an ice bath, consisted of 60 grams of liquid analyzing by infra-red analysis 2.28% formamide, 85% chlorobenzene and 8.6% benzonitrile. This corresponds to a conversion of 9.1% and a yield of 44.2% based on chlorobenzene added.

We claim:

1. A process for preparing aromatic nitriles which comprises reacting a vaporizable nuclear halogenated aromatic compound containing from 1 to 3 halogen atoms of the class consisting of chlorine, bromine and iodine with at least one mol of hydrogen cyanide for each halogen to be replaced, said reaction being carried out in vapor phase at temperatures of from 450° to 900° C. in the presence of a metal oxide of the group consisting of aluminum oxide, nickel oxide and silicon dioxide, the mixed vapors being contacted with the catalyst of space velocities of 250 to 1200 volumes per hour, said vaporizable nuclear halogenated aromatic compound being one that is vaporizable without decomposition at the temperature employed.

2. A process for preparing aromatic nitriles which comprises reacting a vaporizable nuclear halogenated aromatic compound of the group consisting of benzene, naphthalene, thiophene, pyridine and quinoline series containing from 1 to 3 halogen atoms of the class consisting of chlorine, bromine and iodine with at least one mol of hydrogen cyanide for each halogen to be replaced, said reaction being carried out in vapor phase at temperatures of from 450° to 900° C. in the presence of a metal oxide of the group consisting of aluminum oxide, nickel oxide and silicon dioxide, the mixed vapors being contacted with the catalyst at space velocities of 250 to 1200 volumes per hour.

3. A process for preparing p-tolunitrile which comprises reacting p-chlorotoluene with at least one mol of hydrogen cyanide, said reaction being carried out in vapor phase at temperatures of from 500° to 550° C. in the presence of a nickel oxide catalyst supported on aluminum oxide, the mixed vapors being contacted with the catalyst at space velocities of about 250 volumes per hour.

4. A process for preparing phthalonitrile which comprises reacting o-dichlorobenzene with at least one mol of hydrogen cyanide, said reaction being carried out in vapor phase at temperatures of from 500° to 550° C. in the presence of a nickel oxide catalyst supported on aluminum oxide, the mixed vapors being contacted with the catalyst at space velocities of about 500 volumes per hour.

5. A process for preparing terephthalonitrile which comprises reacting p-dichlorobenzene with at least one mol of hydrogen cyanide, said reaction being carried out in vapor phase at temperatures of from 500° to 550° C. in the presence of a nickel oxide catalyst supported on aluminum oxide, the mixed vapors being contacted with the catalyst at space velocities of about 500 volumes per hour.

6. A process for preparing 2-cyanothiophene which comprises reacting 2-chlorothiophene with at least on mol of hydrogen cyanide, said reaction being carried out in vapor phase at temperatures of about 550° C. in the presence of a nickel oxide catalyst supported on aluminum oxide, the mixed vapors being contacted with the catalyst at space velocities of about 300 volumes per hour.

7. A process for preparing alpha-cyanopyridine which comprises reacting alpha-chloropyridine with at least one mol of hydrogen cyanide, said reaction being carried out in vapor phase at temperatures of about 700° C. in the presence of a nickel oxide catalyst supported on aluminum oxide, the mixed vapors being contacted with the catalyst at space velocities of 250 volumes per hour.

References Cited in the file of this patent

UNITED STATES PATENTS 2,591,415　　Engelhardt et al. _____ Apr. 1, 1952

OTHER REFERENCES

Chem. Abst., vol. 43, p. 3439.